United States Patent Office 3,474,140
Patented Oct. 21, 1969

3,474,140
PHENYL ACETIC ACID AMIDES
Gustav Ehrhart, Bad Soden, Taunus, Heinrich Leditschke, Frankfurt am Main, Willi Meixner, Hofheim, Taunus, and Heinrich Ruschig, Bad Soden, Taunus, Germany, assignors to Farbwerke Hoechst Aktiengesellschaft vormals Meister Lucius & Bruning, Frankfurt am Main, Germany, a corporation of Germany
No Drawing. Filed Aug. 8, 1967, Ser. No. 659,015
Claims priority, application Germany, Aug. 13, 1966, F 49,942
Int. Cl. C07c 103/22
U.S. Cl. 260—559         10 Claims

ABSTRACT OF THE DISCLOSURE

Phenyl acetic acid amides, useful as sedatives, having the formula

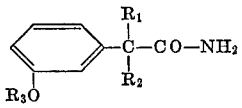

wherein $R_1$, $R_2$, and $R_3$ are lower aliphatic hydrocarbon radicals. Methods of making these compounds.

---

It has been found that compounds of the general formula

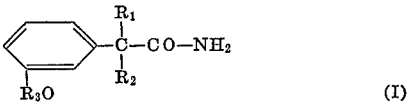

in which $R_1$, $R_2$ and $R_3$ represent identical or different saturated or unsaturated aliphatic hydrocarbon radicals of 1–4 carbon atoms can be obtained by (a) Saponifying substituted phenyl acetonitriles of the general formula

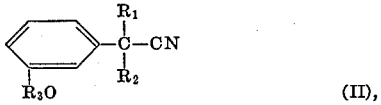

or (b) By reacting substituted phenyl acetic acids of the general formula

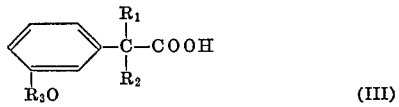

or their functional derivatives capable of reacting with ammonia, or (c) By dehydrogenating ammonia salts of the substituted phenyl acetic acids of the general Formula III or, (d) By hydrogenating by means of a catalyst compounds of the general formula

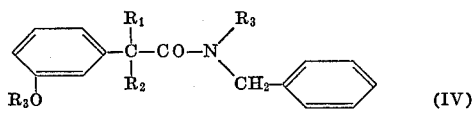

in which $R_3$ represents a hydrogen atom or a benzyl radical, or (e) By treating compounds of the general formula

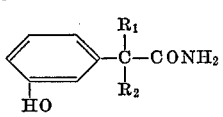

with alkylation- or alkenylation agents.

The preparation of the dialkyl-phenyl-acetonitriles of Formula II used as starting substances is carried out by alkylation of the corresponding phenyl-acetonitriles as is described in the German Auslegeschrift No. 1,242,618. Saponification of the aceto nitriles acording to method (a) of the process of the present invention is carried out, preferably by means of lyes. Advantageously, alkali lyes such as a sodium hydroxide solution or a caustic potash solution are used and working is effected in an aqueous, alcoholic or aqueous-alcoholic solution. As alcohols, preferably lower aliphatic alcohols such as methanol, ethanol or propanol can be used. Saponification is preferably carried out in a pressure vessel at elevated temperatures at 100–220° C., preferably at 130–200° C. Usually the reaction mixture is heated for several hours, the reaction period depending on the temperature applied. At low temperatures heating is continued for about 6–10 hours, whereas at about 160° C. usually 5 hours are sufficient. Working up of the reaction mixture is effected in usual manner. For example the alkaline solution is extracted with an organic solvent, the small amounts of phenyl acetic acids which possibly form remaining in the alkaline solution.

According to method (b), correspondingly substituted phenyl acetic acids or their functional derivatives capable of reacting are reacted with ammonia. The phenyl acetic acids used as starting substances are obtained by heating the corresponding nitriles or amides in an alkaline medium for several hours. As functional derivatives capable of reacting, preferably the corresponding acid chlorides or acid bromides as well as the corresponding alkyl or phenyl esters, are used. The halides and esters are obtained in usual manner from the corresponding carboxylic acids.

The acid halides are reacted with alcoholic ammonia, and the mixture is advantageously left for several hours at room temperature. Reaction can also be terminated by heating to slightly elevated temperatures. The reaction of the corresponding phenyl acetic acid esters takes a little longer than that of the halides and is effected advantageously at elevated temperatures, preferably in a pressure vessel. As esters, in particular, lower alkyl esters such as methyl or ethyl esters, as well as phenyl esters, can be used. As acid derivatives capable of reacting, mixed acid anhydrides can be used. These are obtained from the correspondingly substituted phenyl acetic acids with chloroformic acid esters in the presence of tertiary amines, for example triethyl- or tributylamine.

The products of the invention according to method (c) can also be obtained by dehydrogenation of the ammonium salts of the correspondingly substituted phenyl acetic acids. Dehydrogenation is carried out either by heating for a prolonged period of time to elevated temperatures or by reaction of agents splitting off water, such as acetic acid anhydride.

Furthermore, the products of the invention according to method (d) can be obtained from the mono- or dibenzylamides of the general Formula V, which, for example, are obtained from acid halides with benzyl- or dibenzyl amine. Splitting off of the benzyl radical is advantageously effected by means of catalytic hydrogenation, as catalysts precious metals of the 8th group of the Periodic system, preferably palladium and platinum catalysts being used. Hydrogenation is carried out in the usual manner in the presence of organic solvents, for example acetic acid or lower aliphatic alcohols having 1 to 4 carbon atoms such as methanol, ethanol, propanol, or isopropanol.

Finally the products of the invention can be obtained by alkylation or alkenylation of the corresponding 3-hydroxyphenyl-acetic acid amides. As alkylating agents, dialkyl sulfates such as dimethyl- or diethyl sulfates; allyl bromide; allyl chloride; and alkyl halides, in particular methyl iodide, methyl bromide, ethylbromide, or ethyl iodide, propyl or isopropyl halides, in particular iodides and bromides, or butyl, isobutyl or sec. butyl halides are used. Alkylation is preferably carried out in an alkaline medium, advantageously in the presence of organic solvents such as lower alcohols.

The products of the invention have valuable therapeutic properties and can be used as medicaments. Thus they are distinguished for example by excellent sedative properties which are superior to those of known soporifics even as to their period of effect.

The products of the process, if desired or required in admixture with pharmaceutically usual carriers, may be orally or parenterally administered. When orally administered, the products are preferably used in form of tablets or dragées. For this purpose the products are worked up with the usual carriers such as lactose, starch, tragacanth and magnesium stearate.

The following examples serve to illustrate the invention but they are not intended to limit it thereto.

Example 1

100 g. of 3-methoxy-phenyl-diethyl-acetonitrile (prepared according to German Auslegeschrift No. 1,242,618) are heated for 5 hours to 160° C. with 100 g. of caustic alkali and 300 cc. of alcohol of 94% strength in a shaking device. After evaporation of the solvent in vacuo, the residue is absorbed with 500 cc. of water and chloroform. The aqueous phase which has separated is once more extracted by means of chloroform. The unified chloroform phases are washed with water, dried with sodium sulfate and evaporated. After distillation, there are obtained 72 g. of 3-methoxy-phenyl-diethyl-acetamide boiling at 159°–161° C. under a pressure of 1 mm. of mercury, which, recrystallized from diisopropyl ether, yield crystals melting at 83° C.

Example 2

62.1 g. of 3-oxyphenyl-diethyl-acetamide are dissolved in 500 cc. of alchol and 150 cc. of 2 N sodium hydroxide solution. To this solution 35 cc. of allyl bromide are added dropwise at 80° C. The mixture is boiled under reflux for 15 minutes. A further 150 cc. of 2 N sodium hydroxide solution and 35 cc. of allyl bromide are added, the latter dropwise. The mixture is boiled for another 30 minutes, the alcohol is distilled off under the vacuum from an aspirator, and water, a sodium hydroxide solution and chloroform are added. The chloroform phase is dried by means of sodium sulfate. After evaporation of the solvent, there are obtained 48 g. of the 3-allyloxyphenyl-diethyl-acetamide, which, after recrystallization from diisopropyl-ether, yield 25 g. of crystals melting at 82° C.

The 3-oxyphenyl-diethylacetamide used as starting substance is obtained as follows: 170 g. of 3-methoxyphenyl-diethylacetamide are boiled under reflux for 5 hours with 850 cc. of hydrobromic acid. The reaction solution is diluted with 2 l. of water and shaken three times with chloroform. The chloroform phase is extracted with a sodium hydroxide solution of 10% strength and the sodium hydroxide solution is acidified with 10% hydrochloric acid. After shaking with chloroform, washing with water, drying with sodium sulfate and evaporation of the solvent, there are obtained 163 g. of 3-oxyphenyl-diethylacetamide boiling at 191–195° C. under a pressure of 0.2 mm. of mercury, which, after recrystallization from isopropyl-ether, yield crystals melting at 76° C.

Example 3

From 31 g. of 3-oxyphenyl-diethylacetamide and ethyl bromide there are obtained according to the working method of Example 2, 17 g. of 3-ethoxyphenyl-diethyl-acetamide melting at 95° C.

Example 4

From 31 g. of 3-oxyphenyl-diethylacetamide with n-butyl bromide there are obtained according to the working method of Example 2, 14.5 g. of 3-n-butoxyphenyl-diethylacetamide melting at 70° C.

Example 5

From 31 g. of 3-oxyphenyl-diethylacetamide and isopropylbromide there are obtained according to the working method of Example 2, 22 g. of 3-isopropyloxyphenyl-diethylacetamide melting at 64° C.

Example 6

From 62.1 g. of 3-oxyphenyl-diethylacetamide and sec. butylbromide there are obtained according to the working method of Example 2, 17 g. of 3-sec. butoxyphenyl-diethylacetamide boiling at 156–157° C. under a pressure of 0.08 mm. of mercury.

Example 7

75 g. of 3-methoxyphenyl-ethyl(sec.butyl)-acetonitrile are heated to 190° C. for 5 hours in a shaking device with 75 g. of caustic soda and 300 cc. of alcohol. Then working is continued as described in Example 1. There are obtained 25 g. of 3-methoxy-phenyl-ethyl-sec.butyl-acetamide boiling at 168–170° C. under a pressure of 2 mm. of mercury, which, from diisopropyl-ether, yield colorless crystals melting at 79° C.

The 3-methoxyphenyl-ethyl-acetonitrile serving as starting substance is obtained as an oil boiling at 109° C. under a pressure of 0.7 mm. of mercury from 588 g. of 3-methoxybenzyl-cyanide and 450 g. of ethylbromide in the presence of 160 g. of sodium amide.

25 g. of sodium amide are heated to 80° C. in 700 cc. of absolute toluene and 88 g. of 3-methoxyphenyl-ethyl-acetonitrile dissolved in 100 cc. of toluene are added dropwise. Then heating under reflux is continued for 2 hours. Subsequently 75 g. of sec. butyl bromide are added dropwise and heated under reflux for 1 hour. To the reaction solution water is carefully added. The toluene phase which has separated is washed first with hydrochloric acid of 10% strength, then with sodium hydroxide solution of 10% strength and finally with water and dried over sodium sulfate. After distillation of the toluene there are obtained 88 g. of 3-methoxy-phenyl-ethyl-sec.butyl-acetonitrile boiling at 161–163° C. under a pressure of 9 mm. of mercury.

Example 8

40 g. of 3-methoxyphenyl-dipropyl-acetonitrile are heated to 150° C. for 5 hours with 36 g. of caustic potash and 40 cc. of water and 80 cc. of alcohol. The reaction product is worked up as described in Example 1. The oil obtained (27 g.) is once more heated to 200° C. with 36 g. of caustic potash and 400 cc. of water and 80 cc. of alcohol for 5 hours and worked up as described in Example 1. 3-methoxyphenyl-dipropyl-acetamide boiling at 160–165° C. under a pressure of 1.4 mm. of mercury is obtained, which, after triturating with cyclohexane, yields 4 g. of colourless crystals melting at 91–92° C.

The 3 - methoxyphenyl - dipropyl - acetonitrile serving as starting substance (boiling at 128–131° C. under a pressure of 8 mm. of mercury) is obtained from 3-methoxybenzyl cyanide by reaction of 2 mols of propylbromide in the presence of 2 mols of sodium amide.

Example 9

108 g. of 3-methoxyphenyl-dibutyl acetonitrile are heated to 150° C. in a shaking device for 5 hours with 89 g. of caustic potash in 100 cc. of water and 200 cc. of alcohol. Then further treatment is carried out as described in Example 8. There are obtained 40 g. of 3-methoxyphenyl-dibutylacetamide boiling at 180–184° C. under a pressure of 1 mm. of mercury, which, after triturating with cyclohexane, yield colorless crystals melting at 49–50° C.

The 3-methoxyphenyl-dibutyl-acetonitrile serving as starting substance (boiling at 156–158° C. under a pressure of 1.8 mm. of mercury) is obtained from 3-methoxybenzyl-cyanide by reaction of 2 mols of n-butyl bromide in the presence of 2 mols of sodium amide.

We claim:
1. A phenyl acetic acid amide of the formula

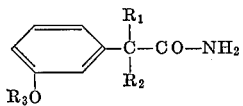

wherein $R_1$ and $R_2$ are alkyl having 2–4 carbon atoms and may be the same or different, and $R_3$ is alkyl having 1–4 carbon atoms or allyl.

2. A compound as defined in claim 1 in which $R_3$ is methyl and $R_1$ and $R_2$ are ethyl.
3. A compound as defined in claim 1 in which $R_3$ is allyl and $R_1$ and $R_2$ are ethyl.
4. A compound as defined in claim 1 in which $R_1$, $R_2$ and $R_3$ are ethyl.
5. A compound as defined in claim 1 in which $R_3$ is butyl and $R_1$ and $R_2$ are ethyl.
6. A compound as defined in claim 1 in which $R_3$ is isopropyl and $R_1$ and $R_2$ are ethyl.
7. A compound as defined in claim 1 in which $R_3$ is sec. butyl and $R_1$ and $R_2$ are ethyl.
8. A compound as defined in claim 1 in which $R_1$ is ethyl, $R_2$ is sec. butyl and $R_3$ is methyl.
9. A compound as defined in claim 1 in which $R_3$ is methyl and $R_1$ and $R_2$ are propyl.
10. A compound as defined in claim 1 in which $R_3$ is methyl and $R_1$ and $R_2$ are butyl.

References Cited

UNITED STATES PATENTS 2,874,188  2/1959  Micucci et al. _____ 260—559

HENRY R. JILES, Primary Examiner

HARRY I. MOATZ, Assistant Examiner

U.S. Cl. X.R.

260—465, 521, 999